United States Patent
Park et al.

(10) Patent No.: US 9,709,252 B2
(45) Date of Patent: Jul. 18, 2017

(54) BACKLIGHT UNIT AND DISPLAY DEVICE INCLUDING TRUSS STRUCTURE

(71) Applicant: Samsung Display Co., Ltd., Yongin, Gyeonggi-Do (KR)

(72) Inventors: Se Ki Park, Hwaseong-si (KR); Su Chang Ryu, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 309 days.

(21) Appl. No.: 14/167,551

(22) Filed: Jan. 29, 2014

(65) Prior Publication Data

US 2015/0049464 A1 Feb. 19, 2015

(30) Foreign Application Priority Data

Aug. 13, 2013 (KR) .......................... 10-2013-0096046

(51) Int. Cl.
| | | |
|---|---|---|
| *G02F 1/13357* | (2006.01) | |
| *F21V 21/00* | (2006.01) | |
| *G02F 1/1333* | (2006.01) | |
| *G02F 1/1335* | (2006.01) | |

(52) U.S. Cl.
CPC ........ *F21V 21/00* (2013.01); *G02F 1/133308* (2013.01); *G02F 1/133608* (2013.01); *G02F 1/133603* (2013.01); *G02F 2001/133314* (2013.01); *G02F 2001/133317* (2013.01)

(58) Field of Classification Search
CPC ......... G02F 1/133608; E04C 2003/043; E04C 2003/486; E04C 2003/491; E04C 3/083; B32B 3/12; B32B 3/20
See application file for complete search history.

(56) References Cited

U.S. PATENT DOCUMENTS

| | | | | | |
|---|---|---|---|---|---|
| 1,006,047 | A | * | 10/1911 | Bates | ..................... E04C 3/083 29/6.2 |
| 1,563,077 | A | * | 11/1925 | Danforth | ................. E04C 3/083 52/634 |
| 1,563,118 | A | * | 11/1925 | Edmund | ................. E04C 3/083 52/632 |
| 1,718,938 | A | * | 7/1929 | Bates | ..................... B21D 47/02 52/635 |
| 1,733,778 | A | * | 10/1929 | Connell | ................... E04C 3/09 29/6.2 |
| 1,933,253 | A | * | 10/1933 | Gersman | ................. E04C 3/083 29/897.31 |
| 2,154,944 | A | * | 4/1939 | Kullmer | ................. E04C 3/292 52/376 |
| 2,392,674 | A | * | 1/1946 | Lachman | ................. E04C 3/08 52/695 |

(Continued)

FOREIGN PATENT DOCUMENTS

| | | |
|---|---|---|
| JP | 2009-244668 | 10/2009 |
| JP | 2010-100218 | 5/2010 |

(Continued)

OTHER PUBLICATIONS

European Search Report corresponding to European Patent Application No. 14156472.4, 11 pages.

*Primary Examiner* — Ismael Negron
(74) *Attorney, Agent, or Firm* — Innovation Counsel LLP

(57) ABSTRACT

A backlight unit includes a side portion having a truss structure, another side portion, and a light source between the side portions.

22 Claims, 21 Drawing Sheets

(56) References Cited

U.S. PATENT DOCUMENTS

| | | | | |
|---|---|---|---|---|
| 2,990,038 A * | 6/1961 | Diamond | ................ | E04C 3/086 29/897.31 |
| 3,462,330 A * | 8/1969 | Greig | .................. | B29C 51/267 156/197 |
| 3,737,964 A * | 6/1973 | Jury | ....................... | B21D 47/02 29/6.1 |
| 3,830,684 A * | 8/1974 | Hamon | .................... | B01J 19/32 261/112.2 |
| 4,150,186 A * | 4/1979 | Kazama | .................... | B32B 3/28 156/210 |
| 4,409,274 A * | 10/1983 | Chaplin | .................... | B32B 3/28 156/210 |
| 5,156,901 A * | 10/1992 | Tanaka | .................... | B32B 29/08 138/121 |
| 5,660,326 A * | 8/1997 | Varano | .................... | B65D 3/22 220/739 |
| 5,688,578 A * | 11/1997 | Goodrich | ............... | B21D 31/04 206/521 |
| 6,407,781 B2 * | 6/2002 | Kitada | .............. | G02F 1/133604 349/113 |
| 6,511,567 B1 * | 1/2003 | Ruggie | ................. | E04C 2/3405 156/205 |
| 7,130,005 B2 | 10/2006 | Takata et al. | | |
| 7,140,158 B2 * | 11/2006 | Steadman | ............... | E04C 3/292 52/694 |
| 7,192,159 B2 | 3/2007 | Huang | | |
| 7,270,467 B2 * | 9/2007 | Kim | .................. | G02F 1/133604 349/58 |
| 7,275,842 B2 * | 10/2007 | Wang | ...................... | F21V 29/83 362/373 |
| 7,375,775 B2 | 5/2008 | Kim | | |
| 7,377,677 B2 * | 5/2008 | Kang | ................ | G02F 1/133611 349/70 |
| 7,701,528 B2 * | 4/2010 | Azuma | ............. | G02F 1/133605 349/58 |
| 7,819,574 B2 * | 10/2010 | Yoo | .................... | G02F 1/133608 362/609 |
| 8,004,630 B2 | 8/2011 | Kwon et al. | | |
| 8,109,480 B2 * | 2/2012 | Lee | .................. | G02F 1/133608 24/456 |
| 8,184,234 B2 * | 5/2012 | Hisada | ............. | G02F 1/133608 349/58 |
| 8,194,207 B2 * | 6/2012 | Kim | .................. | G02F 1/133604 349/58 |
| 8,253,880 B2 | 8/2012 | Park et al. | | |
| 2005/0138879 A1 * | 6/2005 | Snel | ................ | E04C 2/3405 52/506.01 |
| 2006/0077691 A1 * | 4/2006 | Kim | .................. | G02B 6/0051 362/617 |
| 2006/0280883 A1 * | 12/2006 | van de Camp | ........... | B31C 3/00 428/34.2 |
| 2008/0019145 A1 * | 1/2008 | Cho | .................. | G02F 1/133606 362/601 |
| 2008/0030653 A1 * | 2/2008 | Lee | .................. | G02F 1/133604 349/67 |
| 2009/0158686 A1 * | 6/2009 | Oki | ........................ | B21D 47/02 52/643 |
| 2011/0109830 A1 | 5/2011 | Wang et al. | | |
| 2012/0080985 A1 | 4/2012 | Alarcon et al. | | |
| 2012/0086882 A1 | 4/2012 | Itoh | | |
| 2013/0010210 A1 | 1/2013 | Cho | | |
| 2014/0134394 A1 * | 5/2014 | Noble | ....................... | E04C 3/28 428/138 |
| 2015/0029696 A1 * | 1/2015 | Ryu | .................. | G02F 1/133608 362/97.1 |

FOREIGN PATENT DOCUMENTS

KR 10-2011-0077272 7/2011
KR 10-2012-0052104 5/2012

* cited by examiner

BACKLIGHT UNIT AND DISPLAY DEVICE INCLUDING TRUSS STRUCTURE

CROSS-REFERENCE TO RELATED APPLICATION

This application claims priority to and the benefit of Korean Patent Application No. 10-2013-0096046 filed in the Korean Intellectual Property Office on Aug. 13, 2013, the entire contents of which are incorporated herein by reference.

BACKGROUND (a) Technical Field

The present invention is related to a backlight unit and a display device that includes the backlight unit.

(b) Description of the Related Art

A display device may include a display panel and a backlight unit. The display panel may display an image. The backlight unit may provide light to the display panel.

The display panel and the backlight unit may be fastened to each other so as to prevent a light loss. The display device may further include a case that encloses and protects the display panel and/or the backlight unit so as to prevent a damage, which may be caused by an external impact. For example, the backlight unit and a portion of the display panel may be disposed in a bottom chassis. Generally, the bottom chassis may be made of a metal material for dissipating heat generated from the backlight unit and may include a plurality of structures for securing the backlight unit. For reinforcing the structure of the bottom chassis and/or the display device, the bottom chassis may include a metal reinforcement bar. The metal material and/or the metal reinforcement bar may undesirably contribute to the weight of the bottom chassis and the total weight of the display device.

The above information disclosed in this Background section is for enhancement of understanding of the background of the invention. The Background section may contain information that does not form the prior art that is already known in this country to a person of ordinary skill in the art.

SUMMARY

Embodiment of the present invention may be related to a backlight unit that has a satisfactorily light weight and has sufficient structural rigidity. Embodiments of the present invention may be related to a display device that includes the backlight unit.

An embodiment of the present invention may be related to a backlight unit for use in an image display device. The backlight unit may include a first structural unit. The first structural unit may include a first side portion and a second side portion. The first side portion may have a first truss structure. The backlight unit may further include a light source that is disposed between the first side portion and the second side portion and is configured to emit light.

The backlight unit may include a diffusion plate disposed between the first truss structure and a top portion of the structural unit and configured to diffuse the light.

The first truss structure may include a first plate, a second plate, a first reinforcing member, and a second reinforcing member. The first reinforcing member and the second reinforcing member may be disposed between the first plate and the second plate. The first reinforcing member may extend in a first direction. The second reinforcing member may extend in a second direction that is different from the first direction.

The second plate may be directly connected to the first plate and may be disposed at a first acute angle with respect to the first plate.

The backlight unit may include a diffusion plate dispose at a second acute angle with respect to the second plate and configured to diffuse the light. The sum of the second acute angle and the first acute angle may be substantially equal to 90 degrees.

The first reinforcing member, the second reinforcing member, and at least one of the first plate and the second plate may form a structural element that has a triangular inner surface. The structural element may have three triangular inner surfaces abutting each other.

The backlight unit may include a third reinforcing member connected between the first plate and the second plate and disposed perpendicular to the first plate.

The second plate may be disposed between the first plate and at least one of the light source and a reflecting sheet that is configured to reflect the light.

The backlight unit may include a support member disposed between the first side portion and the second side portion and configured to support at least a portion of a weight of the light source. The second side portion may have a second truss structure. The support member may be directly connected to each of a bar member of the first truss structure and a bar member of the second truss structure.

At least one of the light source and a reflecting sheet that is configured to reflect the light may be disposed between a reinforcing member of the first truss structure and a reinforcing member of the second structure. The reinforcing member of the first truss structure may be disposed at a first acute angle with respect to the bar member of the first truss structure. The reinforcing member of the second truss structure is disposed at a second acute angle with respect to the bar member of the second truss structure. The second acute angle may be equal to the first acute angle.

The backlight unit may include a first support member and a second support member spaced from each other. Each of the first support member and the second support member may be disposed between the first side portion and the second side portion and may be directly connected to each of a bar member of the first truss structure and a bar member of the second truss structure. The first support member may overlap at least one of the light source and a first printed circuit board that is electrically connected to the light source.

The backlight unit may include a reflecting sheet disposed between the first support member and the second support member, disposed between the bar member of the first truss structure and the bar member of the second truss structure, and configured to reflect the light.

The backlight unit may include the first printed circuit board. The first printed circuit board may overlap the first support member. The backlight unit may further include a second printed circuit board. The second printed circuit board may be spaced from the first printed circuit board, may overlap the first support member, and may be electrically connected to a second light source.

The second support member may overlap both the first printed circuit board and the second printed circuit board.

The backlight unit may include a reflecting sheet disposed between the first truss structure and the light source and configured to reflect the light.

The backlight unit may include a second structural unit that may enclose the first structural unit and may have a second truss structure. The first truss structure may be disposed between the second truss structure and the light source.

The backlight unit may include a diffusion plate configured to diffuse the light. The backlight unit may further include a second structural unit that may have a second truss structure. The first truss structure may be disposed between the second truss structure and the diffusion plate.

An embodiment of the present invention may be related to a display device. The display device may include the following elements: a display panel configured to display an image; a light source configured to provide light for the display panel to display the image; and a first structural unit that has a first truss structure. The first truss structure may overlap at least one of the display panel and the light source.

The light source may be disposed between the first truss structure and the display panel.

The display device may include a diffusion plate disposed between the first truss structure and the display panel and configured to diffuse the light.

The display device may include a second structural unit. The second structural unit may include a first side portion and a second side portion. The first side portion may have a second truss structure. The light source may be disposed between the first side portion and the second side portion. The second structural unit may be disposed inside the first structural unit.

An embodiment of the present invention may be related to a backlight unit that may include the following elements: a light source for emitting light; and a case for enclosing and/or securing the light source, the case including a side portion, wherein the side portion of the case includes a truss structure.

The case may include a bottom plate, which supports the light source, and a mold frame, which forms at least a portion of the side portion of the case.

The mold frame may include the following elements: a pair of outer truss members; and a first reinforcing truss member and a second reinforcing truss member positioned between the outer truss members and extending in different directions.

Each of the outer truss member and the reinforcing truss members may have a plate structure.

The outer truss members may be directly connected to each other and may be disposed at an acute angle with respect to each other.

The first reinforcing truss member, the second reinforcing truss members, and at least one of the outer truss members together may form a structural element that has a triangular surface. A unit space or hollow that has a triangular-based-pyramid shape may be formed inside the structural element.

The backlight unit may include a vertical reinforcing member that may directly connect to each of the outer truss members and may extend substantially perpendicular to a surface of at least one of the outer truss members.

The vertical reinforcing member and the reinforcing truss members together may form a structural element that has a triangular-based-pyramid-shaped unit space.

The case may include a bottom chassis, which may enclose and/or secure the light source. The bottom chassis may include the following elements: a floor portion on which the light source is mounted; and a first side portion connected to the floor portion and forming at least a portion of the side portion of the case.

The first side portion may include the following elements: a pair of outer truss members forming upper and lower edge frameworks; and a first reinforcing truss member and a second reinforcing truss member, which are positioned between the pair of outer truss members and extend in different directions.

The outer truss members and the reinforcing truss members each may have a bar shape.

The first reinforcing truss member, the second reinforcing truss member, and at least one of the outer truss member together may form a first triangular unit space.

The backlight unit may include a vertical reinforcing member, which may directly connect to each of outer truss members and may be substantially perpendicular to both the outer truss members.

The vertical reinforcing member, the first reinforcing truss member, the second reinforcing truss member together may form a second triangular unit space that is smaller than the first triangular unit space.

A floor portion of the bottom chassis may include a reinforcing bar, which connects two portions of an outer truss member.

At least one of the outer truss members and the reinforcing truss members may have a hollow structure.

The backlight unit may include a reflecting sheet positioned on the bottom chassis.

The bottom chassis may include a heat-conductive material, e.g., a metal.

The case may include a rear cover, which covers a rear surface of the backlight unit and may protect the backlight unit.

The rear cover may include a floor portion and a second side portion, which is connected to the floor portion and forms at least a portion of the side portion of the case.

An embodiment of the present invention may be related to a display device that may include the following elements: a display panel including a plurality of pixels for displaying an image; a backlight unit (which may be positioned on a rear surface of the display panel and) including a light source configured to provide light for the display panel to display the image; and a case that may enclose the light source and may include a side portion, wherein the side portion of the case includes a truss structure.

The case may include a bottom plate, which supports the light source, and a mold frame, which forms at least a portion of the side portion of the case and supports the display panel.

The mold frame may include the following elements: a pair of outer truss members; and a first reinforcing truss member and a second reinforcing truss member positioned between the outer truss members, extending in different directions, and crossing each other or meeting each other at one point.

The case may include a bottom chassis, which may enclose and/or secure the light source. The bottom chassis may include the following elements: a floor portion on which the light source is mounted; and a first side portion connected to the floor portion and forming at least a portion of the side portion of the case.

The first side portion may include: a pair of outer truss members forming upper and lower edge frameworks; and a first reinforcing truss member and a second reinforcing truss member positioned between the pair of outer truss members and extending in different directions.

The case may include a rear cover, which covers and protects a rear surface of the backlight unit. The rear cover may include a floor portion and a second side portion, which is connected to the floor portion and forms at least a portion of the side portion of the case.

DETAILED DESCRIPTION OF THE EMBODIMENTS

Figure 1:
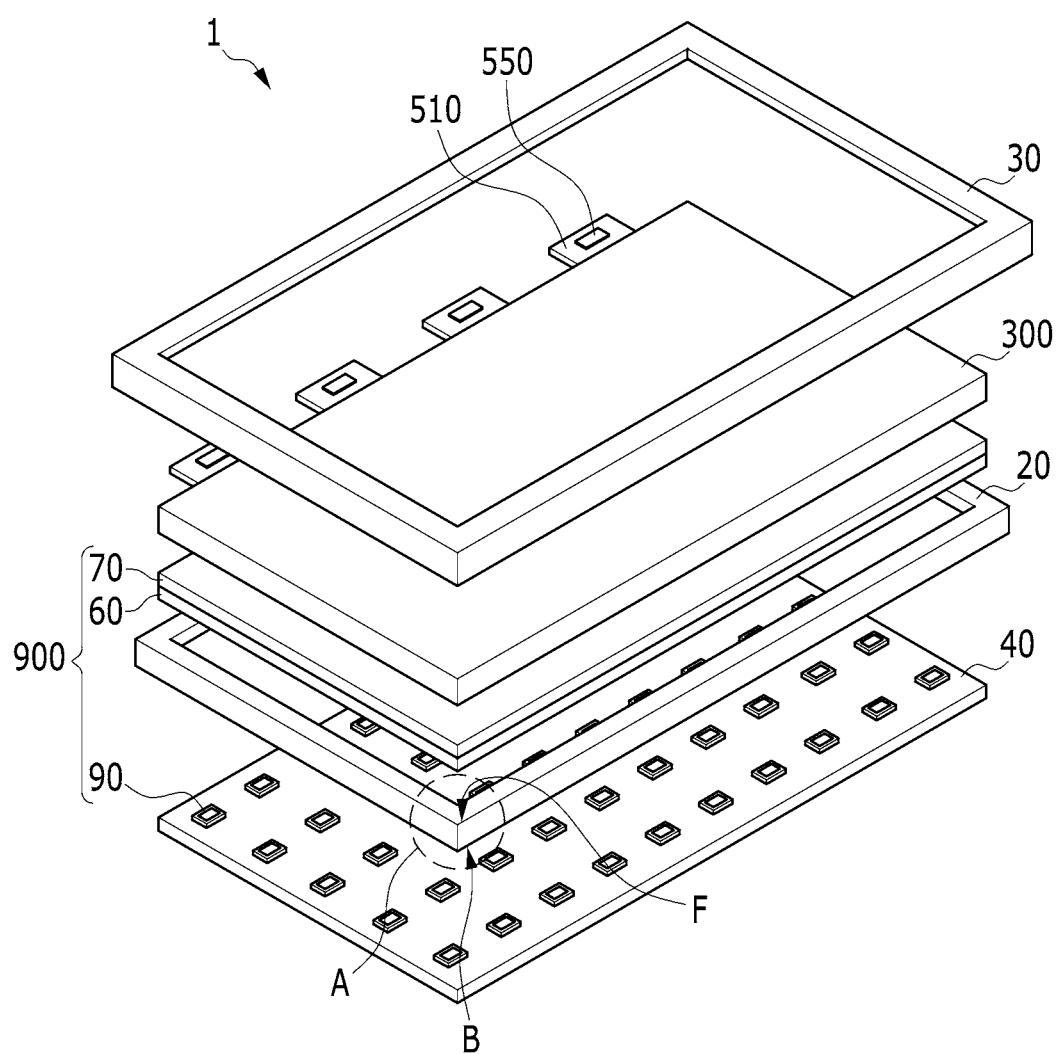
FIG. 1 is an exploded perspective view of illustrating display device according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, thicknesses of layers, films, panels, regions, etc., may be exaggerated for clarity. Like reference numerals may designate like elements in the specification. If an element, such as a layer, film, region, or substrate, is referred to as being "on" another element, it can be directly on the other element, or at least one intervening element may also be present. In contrast, if an element is referred to as being "directly on" another element, there are no intended intervening elements (except one or more environmental elements, such as air) present.

Although the terms "first", "second", etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively.

Figure 2:
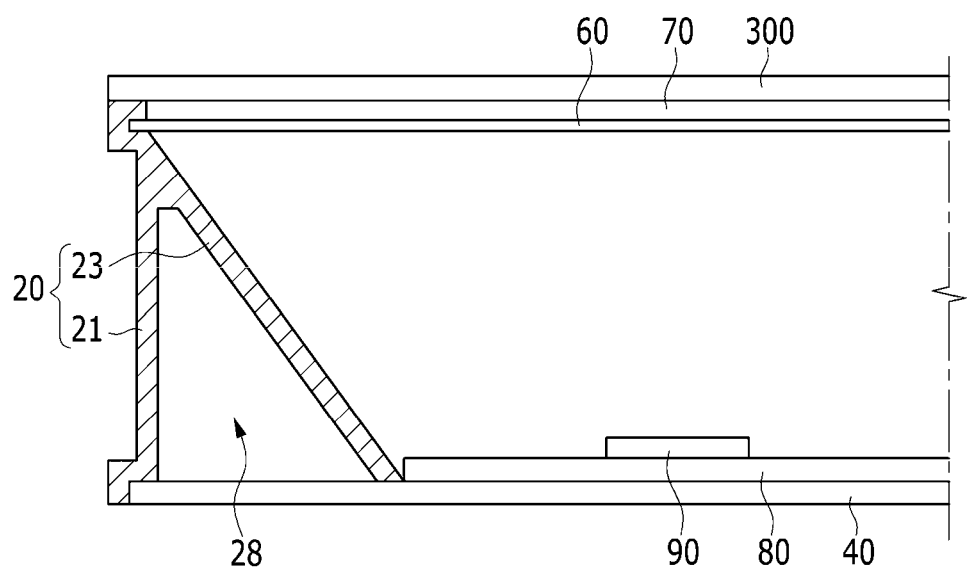
FIG. 2 is a cross-sectional view illustrating the display device according to an embodiment of the present invention.
Figure 3:
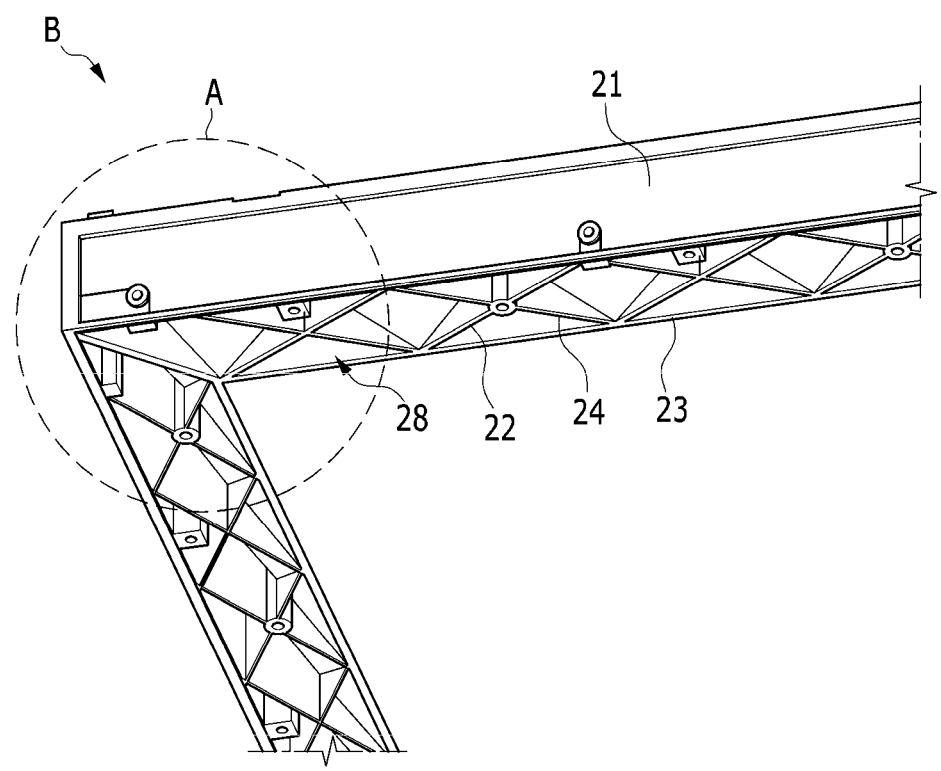
FIG. 3 is a perspective view illustrating a portion of a mold frame of the display device according to the embodiment.
Figure 4:
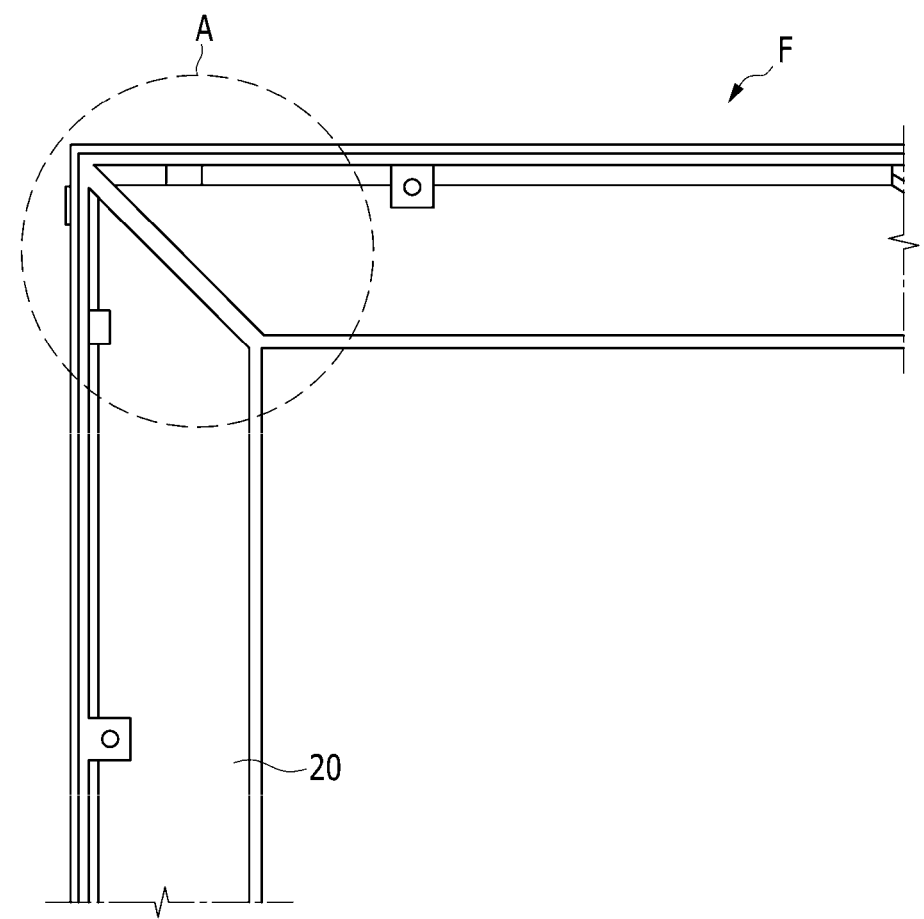
FIG. 4 is a front view illustrating a portion of the mold frame of the display device according to an embodiment of the present invention.
Figure 5:
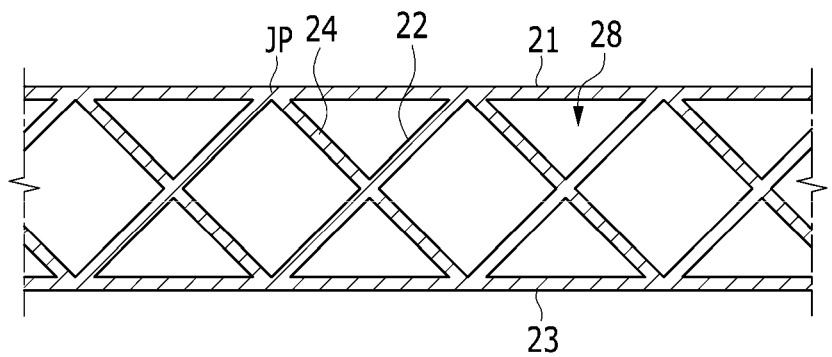
FIG. 5 is a plan view illustrating a truss structure of the mold frame of the display device according to an embodiment of the present invention.
Figure 6:
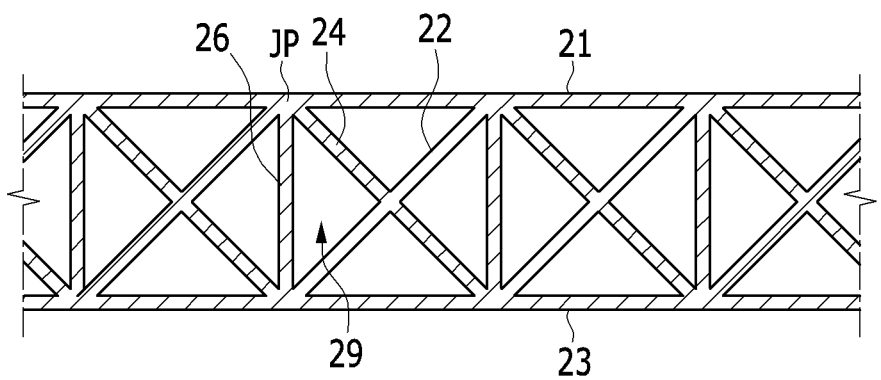
FIG. 6 is a plan view illustrating a truss structure of the mold frame of the display device according to an embodiment of the present invention.

FIG. 1 is an exploded perspective view illustrating a display device according to an embodiment of the present invention. FIG. 2 is a cross-sectional view illustrating the display device according to an embodiment of the present invention. FIG. 3 is a perspective view (e.g., viewed in a direction B indicated in FIG. 1) illustrating a portion of a mold frame of the display device according to an embodiment of the present invention. FIG. 4 is a front view (e.g., viewed in a direction F indicated in FIG. 1) illustrating a portion of the mold frame of the display device according to an embodiment of the present invention. FIG. 5 is a plan view illustrating a truss structure of the mold frame of the display device according to an embodiment of the present invention. FIG. 6 is a plan view illustrating a truss structure of the mold frame of the display device according to an embodiment of the present invention.

Referring to FIGS. 1 and 2, the display device 1 includes a display panel 300 and a backlight unit 900.

The display panel 300 may be or may include one or more of various flat panel display (FPD) members, such as one or more of a liquid crystal display (LCD) panel, an organic light emitting display (OLED) panel, and an electrowetting display (EWD) panel. The display panel 300 includes a plurality of signal lines and a plurality of pixels PX. The pixels PX are connected to the signal lines and substantially form a matrix. The signal lines may include a plurality of gate lines (not illustrated) for transferring gate signals and a plurality of data lines (not illustrated) for transferring data voltages.

Each pixel may include a switching element, which may be connected to a corresponding gate line and a corresponding data line, and a pixel electrode, which may be connected to the switching element. The switching element may include a thin film transistor and may be turned on or turned off, depending on the gate signal transferred by the gate line, to timely transfer the data voltage transferred by the data line to the pixel electrode. Each pixel may display an image of a corresponding luminance depending on the data voltage applied to the pixel electrode.

As illustrated in FIG. 1, the display panel 300 may be electrically connected to a driving unit 550 through a tape carrier package (TCP) 510 and/or an equivalent element. The driving unit 550 may be mounted on the TCP 510, e.g., in an integrated circuit (IC) chip, or may be mounted on a printed circuit board (PCB) that is connected to the TCP 510. In an embodiment, the driving unit 550 may be mounted on the display panel 300, e.g., in an IC chip, or may be integrated on the display panel 300, along with the signal lines, the thin film transistors, etc.

The backlight unit 900 overlaps the display panel 300 and is configured to irradiate light to the display panel 300.

The backlight unit 900 may include at least one light source 90, a diffusion plate 60, an optical sheet 70, etc.

The light source 90 may include one or more of a cold cathode fluorescent lamp (CCFL), a flat fluorescent lamp (FFL), a light emitting diode (LED), etc. The light source 90 may be mounted on at least one printed circuit board (PCB) (not illustrated).

According to an embodiment of the present invention, as illustrated in FIGS. 1 and 2, the backlight unit 900 may be a direct type backlight unit, and the light source 90 may directly irradiate light onto the display panel 300. In an embodiment of the present invention, the backlight unit 900 may be an edge type backlight unit, the light source 90 may be positioned at an edge of the backlight unit 900, and the light emitted from the light source 90 may be irradiated to the display panel 300 through a light guide plate (not illustrated).

The diffusion plate 60 is positioned over the light source 90 to diffuse light incident from the light source 90, thereby improving uniformity of luminance of light. The diffusion plate 60 may disperse the light incident from the light source 90 to prevent the light from concentrating locally.

The optical sheet 70 may include at least one optical sheet, such as a prism sheet, configured for improving the uniformity of luminance of light transmitting the diffusion plate 60 and/or for improving efficiency of light.

The backlight unit 900 may include a mold frame 20 and a bottom plate 40 for enclosing, protecting, supporting, and/or securing (or fastening) other elements of the backlight unit 900.

The bottom plate 40 may support and/or secure the light source 90. An upper surface of the bottom plate 40 may include a reflecting surface, and/or a reflecting sheet 80 may be positioned between the bottom plate 40 and the light source 90. The reflecting sheet 80 and/or the reflecting surface of the bottom plate 40 may reflect light emitted from the light source 90 toward the display panel 300, thereby preventing the light from leaking and/or maximizing utilization of the light. The bottom plate 40 may be made of a heat-conductive material, such as aluminum (Al), for effectively dissipating heat generated by the light source 90.

The mold frame 20 is fastened to the bottom plate 40 to secure and/or protect the display panel 300, the diffusion plate 60, and/or the optical sheet 70. An upper portion of the mold frame 20 may have a groove in which the display panel 300, the diffusion plate 60, and/or the optical sheet 70 may be seated. The mold frame 20 may include one or more plastic materials, such as polymer resin.

The display device may further include a top chassis 30 for enclosing, protecting, supporting, and/or securing (or fastening) the display panel 300 and/or the backlight unit 900. The top chassis 30 includes an opening that may expose a display area of the display panel 300. The top chassis 30 may include a front portion for covering an edge portion of the upper surface (or front surface) of the display panel 300 and side portions for enclosing or covering sides of the display panel 300 and the backlight unit 900. The edge portion of the display panel 300 may substantially surround and/or neighbor the display area of the display panel 300. The sides of the display panel 300 may be substantially perpendicular to the upper surface (or front surface) of the display panel 300. The display panel 300 may be seated on the mold frame 20 and may be secured in the top chassis 30. The top chassis 30 may include one or more insulating materials, such as plastic.

At least a structural unit of the backlight unit 900, e.g., a side portion of the mold frame 20 of the backlight unit 900, may include a truss structure. The side portion of the backlight unit 900 may receive, overlap, and/or neighbor the sides or edge portions of the display panel 300, which may surround the display area of the display panel 300.

The truss structure may include triangular units formed by interconnected truss members. The truss members may include one or more bar members and/or one or more plate members. The truss structure may be substantially rigid, robust, resilient, and/or stable.

Referring to FIGS. 2 to 6, the truss structure of the mold frame 20 may include a plurality of truss members. The truss members may include outer truss members 21 and 23, which may form an outer frame of the mold frame 20, and a plurality of reinforcing truss members 22 and 24, which may be directly connected to (and fastened to) the outer truss members 21 and 23. The outer truss members 21 and 23 may be connected through the reinforcing truss members 22 and the reinforcing truss members 24.

The outer truss member 21 and the outer truss member 23 may extend substantially parallel to each other, may overlap each other, and each may have a plate shape. As illustrated in FIGS. 2 and 3, a plate surface of the outer truss member 23 may be disposed at a first predetermined acute angle with respect to a plate surface of the outer truss member 21 and may be disposed at a second predetermined acute angle with respect to at least one the diffusion plate 60, the optical sheet 70, and the display panel 300, wherein the sum of the first predetermined acute angle and the second predetermined acute angle may be substantially equal to 90 degrees. By forming an acute angle between the outer truss member 21 and the outer truss member 23, the mold frame 20 may further secure and protect the display panel 300, the diffusion plate 60, and/or the optical sheet 70.

Referring to FIG. 5, a first reinforcing truss member 22 and a first reinforcing truss member 24 are positioned between the outer truss member 21 and the outer truss member 23 and extend in different directions to form an X-shaped structure. Each reinforcing truss member 22 and each reinforcing truss member 24 may be disposed at an acute angle and an obtuse angle with respect to the outer truss member 21 and the outer truss member 23, respectively. A second reinforcing truss member 22 and the first reinforcing truss member 24 may meet (and directly connect to) each other at a joint point JP and may connect to one of the outer truss members 21 and 23 (e.g., the outer truss member 21) at the joint point JP. The reinforcing truss member 22 and the reinforcing truss member 24 each may have a plate shape.

According to an embodiment of the present invention, reinforcing truss members disposed between two outer truss members may form V-shaped structures without forming X-shaped structures; two reinforcing truss members that extend in different directions may connect to each other at a joint point JP and may connect to one of the two outer truss members at the joint point JP. In an embodiment, reinforcing truss members disposed between two outer truss members may indirectly connect to each other through the two outer truss members. According to such connection arrangements of the truss members, the strength of the mold frame 20 may be improved.

A reinforcing truss member 22, a reinforcing truss member 24, and one of the outer truss members 21 and 23 may form a unit space 28 (i.e., an empty space or cavity) that may have a triangular cross-section. The unit space 28 may be an inner space of a structural element of the truss structure; the structural element may include one or more triangular inner side surfaces. The truss structure, which includes unit spaces 28, may substantially minimize the weight of the mold frame 20 while providing sufficient strength of the mold frame 20.

Referring to FIG. 6, the truss structure of the backlight unit 900, for example, the truss structure of the mold frame 20, may further include a plurality of vertical reinforcing members 26, in addition to the truss structure illustrated in FIG. 5. A vertical reinforcing member 26 may connect two joint points JP, wherein two or more of a reinforcing truss member 22, a reinforcing truss member 24, the outer truss member 21, and the outer truss member 23 may directly connect to each other at each joint point JP. A vertical reinforcing member 26 may extend substantially perpendicular to at least one of the plate surfaces of the outer truss members 21 and 23.

A vertical reinforcing member 26, a reinforcing truss member 22, and a reinforcing truss member 24 may form a unit space 29 (i.e., an empty space or cavity) that may have a triangular cross-section. The truss structure, which includes unit spaces 28 (illustrated in FIG. 5) and unit spaces 29, may substantially minimize the weight of the mold frame 20 while providing sufficient strength of the mold frame 20.

Figure 7:
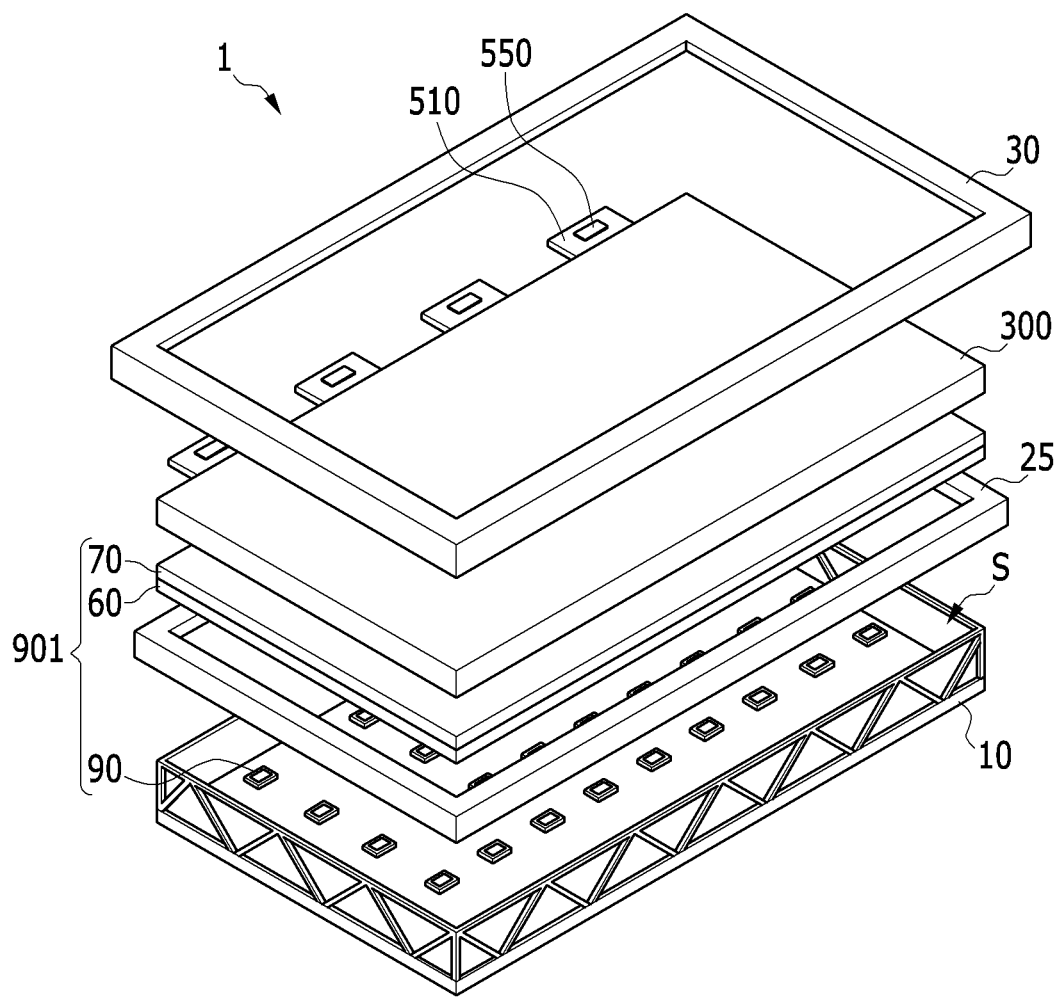
FIG. 7 is an exploded perspective view illustrating a display device according to an embodiment of the present invention.
Figure 8:
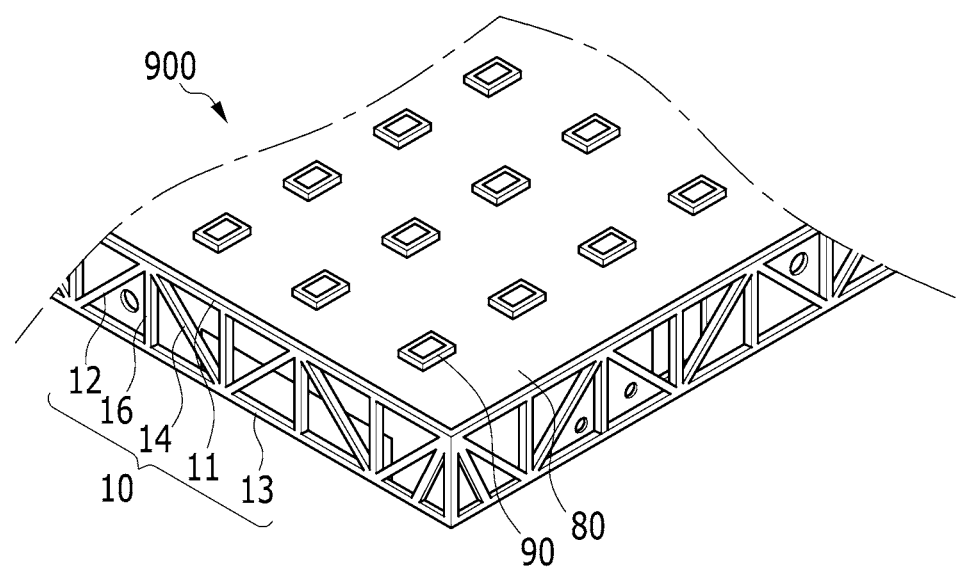
FIG. 8 is a perspective view illustrating a backlight unit according to an embodiment of the present invention.
Figure 9:
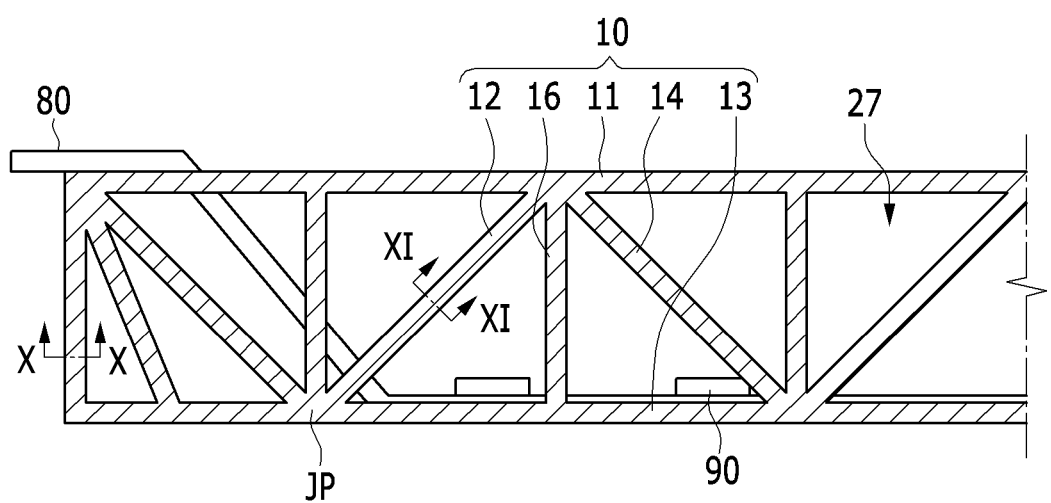
FIG. 9 is a cross-sectional view illustrating the backlight unit according to an embodiment of the present invention.
Figure 10:
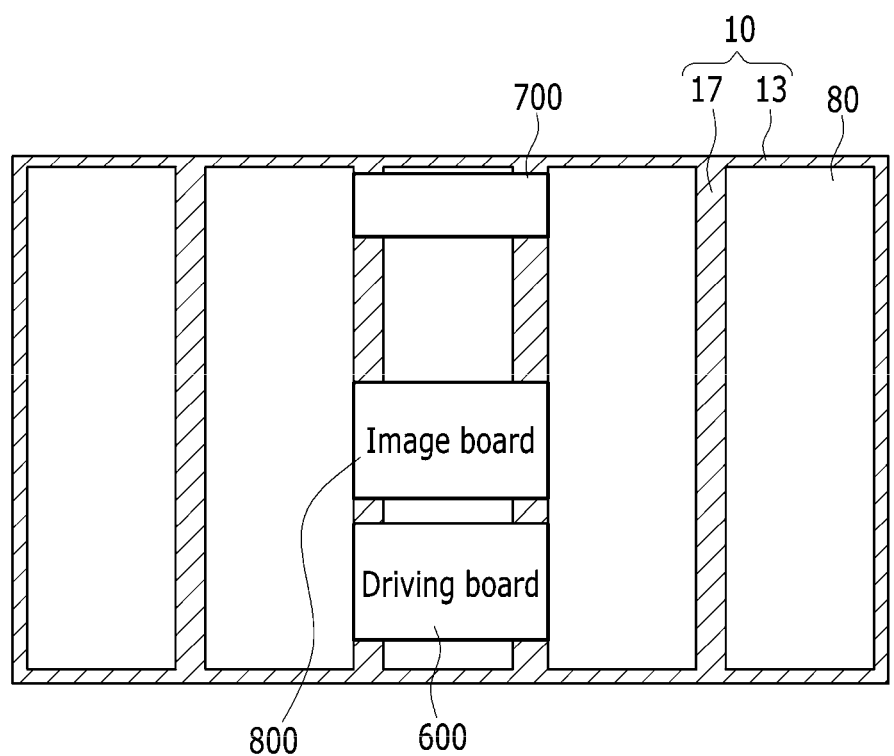
FIG. 10 is a schematic rear view illustrating the backlight unit according to an embodiment of the present invention.
Figure 11:
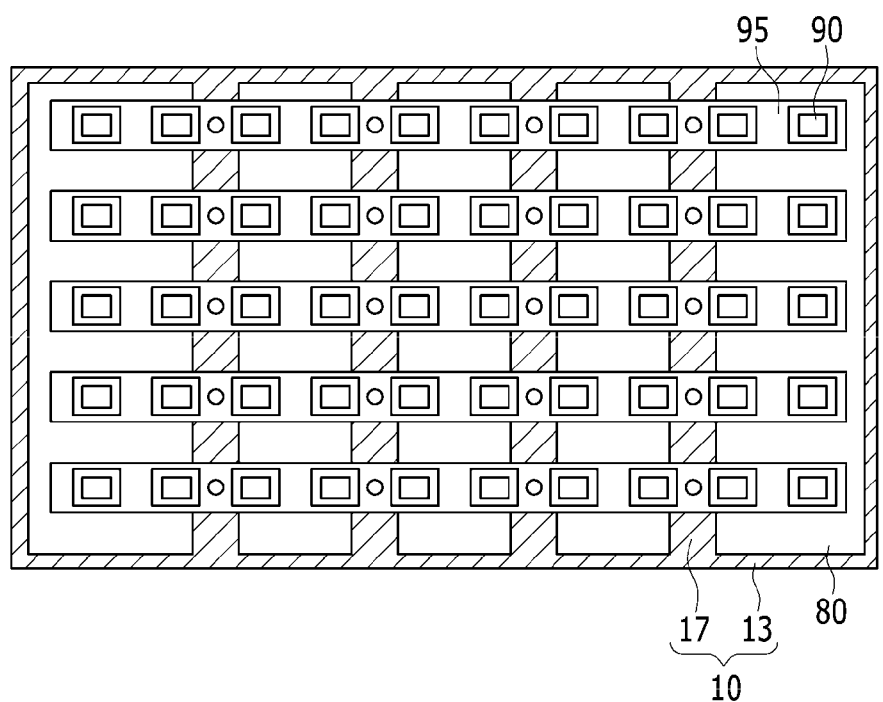
FIG. 11 is a schematic front view illustrating the backlight unit according to an embodiment of the present invention.
Figure 12:
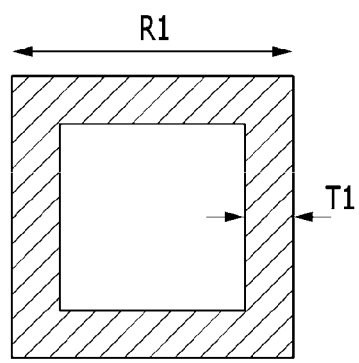
FIG. 12 is a cross-sectional view illustrating a truss member of a bottom chassis of the backlight unit according to an embodiment of the present invention.
Figure 13:
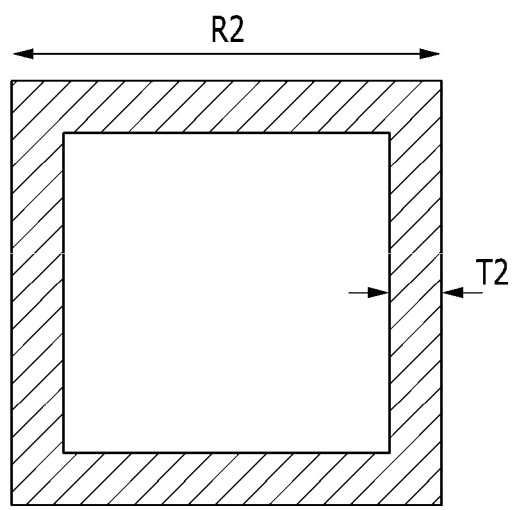
FIG. 13 is a cross-sectional view illustrating a truss member of a bottom chassis of the backlight unit according to an embodiment of the present invention.

FIG. 7 is an exploded perspective view illustrating a display device according to an embodiment of the present invention. Some elements and/or features of the display device illustrated in FIG. 7 may be substantially identical to or analogous to some elements and features of the display device described with reference to one or more of FIGS. 1 to 6. FIG. 8 is a perspective view illustrating a backlight unit according to an embodiment of the present invention. FIG. 9 is a cross-sectional view illustrating the backlight unit according to an embodiment of the present invention. FIG. 10 is a schematic rear view illustrating the backlight unit according to an embodiment of the present invention. FIG. 11 is a schematic front view illustrating the backlight unit according to an embodiment of the present invention. FIG. 12 is a cross-sectional view illustrating a vertical truss member of a bottom chassis of the backlight unit taken along the plane X-X indicated in FIG. 9 according to an embodiment of the present invention. FIG. 13 is a cross-sectional view illustrating a reinforcing truss member of a bottom chassis of the backlight unit taken along the plane XI-XI indicated in FIG. 9 according to an embodiment of the present invention. FIG. 14A, FIG. 14B, FIG. 14C, and FIG. 14D are diagrams illustrating cross-sectional structures of one or more truss members of the bottom chassis of the backlight light according to one or more embodiments of the present invention.

Referring to FIG. 7, the display device may include a display panel 300 and a backlight unit 901.

Some elements and features of the display panel 300, the driving unit 550, the TCP 510, the diffusion plate 60, the optical sheet 70, and the light source 90 illustrated in FIG. 7 may be substantially identical to or analogous to some elements and features of the display panel 300, the driving unit 550, the TCP 510, the diffusion plate 60, the optical sheet 70, and the light source 90 described with reference to one or more of FIGS. 1 to 6.

The backlight unit 901 overlaps the display panel 300 and is configured to irradiate light to the display panel 300. The backlight unit 901 may include the at least one light source 90, a diffusion plate 60, an optical sheet 70, etc.

According to an embodiment of the present invention, as illustrated in FIG. 7, the backlight unit 901 may be a direct type backlight unit, and the light source 90 may directly irradiate light onto the display panel 300. In an embodiment of the present invention, the backlight unit 901 may be an edge type backlight unit, the light source 90 may be positioned at an edge of the backlight unit 901, and the light emitted from the light source 90 may be irradiated to the display panel 300 through a light guide plate (not illustrated).

The backlight unit 901 may include a mold frame 25 and a bottom chassis 10 for enclosing, protecting, supporting, and/or securing (or fastening) other elements of the backlight unit 900.

The mold frame 25 is fastened to the bottom plate 10 to secure and/or protect the display panel 300, the diffusion plate 60, and/or the optical sheet 70. The upper portion of the mold frame 25 may have a groove in which the display panel 300, the diffusion plate 60, and/or the optical sheet 70 may be seated. The mold frame 25 may include one or more plastic materials, such as polymer resin. Some elements and/or features of the mold frame 25 illustrated in FIG. 7 may be substantially identical to or analogous to some elements and features of the mold frame 20 described with reference to one or more of FIGS. 1 to 6.

The bottom chassis 10 may support and/or secure the light source 90. An inside of the bottom chassis 10 may include a reflecting surface, and/or a reflecting sheet 80 may be positioned between the bottom plate 10 and the light source 90. The reflecting sheet 80 and/or the reflecting surface of the bottom chassis 10 may reflect light emitted from the light source 90 toward the display panel 300, thereby preventing the light from leaking and/or maximizing utilization of the light. The bottom chassis 10 may be made of a heat-conductive material, such as aluminum (Al), for effectively dissipating heat generated by the light source 90.

The bottom chassis 10 may include a floor portion, on which the light source 90 is mounted, and a side portion, which is connected to the floor portion and forms a portion of a side of the backlight unit 901.

At least a structural unit of the backlight unit 901, e.g., a side portion of the bottom chassis 10 of the backlight unit 901, may include a truss structure.

Referring to FIGS. 7 to 9, the truss structure of the side portion of the bottom chassis 10 may include a plurality of truss members. The truss members may include outer truss members 11 and 13, which may form upper and lower edge frameworks, and a plurality of reinforcing truss members 12 and 14, which may be directly connected to (and fastened to) the outer truss members 11 and 13. The outer truss members 11 and 13 and the reinforcing truss members 12 and 14.

The outer truss member 11 and the outer truss member 13 may extend substantially parallel to each other, may overlap each other, and each may have a bar shape. The outer truss member 13 may form a floor portion (e.g., the outer portion of the floor portion) of the bottom chassis 10.

A reinforcing truss member 12 and a reinforcing truss member 14 are positioned between the outer truss member 11 and the outer truss member 13 and extend in different directions to form a V-shaped structure (a substantially light-weight structure) or an X-shaped structure (a substantially rigid structure). Each reinforcing truss member 12 and each reinforcing truss member 14 each may be disposed at an acute angle and an obtuse angle with respect to the outer truss member 11 and the outer truss member 13, respectively. A reinforcing truss member 12 and a reinforcing truss member 14 may meet (and directly connect to) each other at a joint point JP. The reinforcing truss member 12 and the reinforcing truss member 14 each may have a bar shape.

As illustrated in FIG. 9, a reinforcing truss member 12 and a reinforcing truss member 14 may be directly connected to each other and to the outer truss member 11 or the outer truss member 13 at a joint point JP. In an embodiment, reinforcing truss members 12 and reinforcing truss member 14 may be indirectly connected to each other through the outer truss member 11 and/or the outer truss member 13.

A reinforcing truss member 12, a reinforcing truss member 14, and one of the outer truss members 11 and 13 may form a structure that includes a triangular unit space 27 and/or a triangular unit space larger than (e.g., substantially twice as large as) the triangular unit space 27. The truss structure, which includes unit spaces 27, may substantially minimize the weight of the bottom chassis 10 while providing sufficient strength of the bottom chassis 10.

Referring to FIG. 9, the truss structure of the backlight unit 900, for example, the truss structure of the bottom chassis 10, may further include a plurality of vertical reinforcing members 16. A vertical reinforcing member 16 may connect two joint points JP, wherein two or more of a reinforcing truss member 12, a reinforcing truss member 14, the outer truss member 11, and the outer truss member 13 may directly connect to each other at each joint point JP. A vertical reinforcing member 16 may extend substantially perpendicular to each of the outer truss members 11 and 13.

A vertical reinforcing member 16, one of two reinforcing truss members 12 and 14, and one of the two outer truss members 11 and 13 may form a triangular unit space 27. The truss structure of the bottom chassis 10 may have a plurality of triangular unit spaces 27.

Referring to FIGS. 10 and 11, the floor portion of the bottom chassis 10 may include a plurality of reinforcing bars 17. Each reinforcing bar 17 may extend between (and may directly connect to) two portions of the outer truss member 13 that are separated from each other and may be substantially perpendicular to each of the two portions of the outer truss member 13. The shape and number of reinforcing bars 17 may vary according to various embodiments. The reinforcing bars 17 may be fastened to the outer truss member 13.

Referring to FIG. 10, a printed circuit board 700 (to which the driving unit 550 for driving the display panel 300 may be electrically connected), an image board 800 (which may transmit an image signal), a driving board 600 (which may control the backlight unit 900 and/or the light sources 90), etc. may be attached to a rear surface of the floor portion (e.g., rear surfaces of one, two, or more reinforcing bars 17) of the bottom chassis 10.

Referring to FIG. 11, the light sources 90 may be mounted on at least one printed circuit board (PCB) 95, which may be mounted on one or more reinforcing bars. The backlight unit 900 may include a plurality of PCBs 95 spaced from and/or parallel to each other, wherein each PCB 95 may support and/or may be electrically connected to a plurality of (e.g., a row of) light sources 90, may be supported by a plurality of reinforcing bars 17, and/or may extend substantially perpendicular to at least one reinforcing bar 17. As illustrated in FIG. 11, reflecting sheets 80 may be positioned only regions between the reinforcing bars 17. Each reflecting sheet may be surrounded by two portions of the outer truss member 13 and two reinforcing bars 17. In an embodiment, one or more reflecting sheets 80 may be positioned between at least one printed circuit board (PCB) 95 and the bottom chassis 10.

FIG. 12 is a cross-sectional view illustrating a vertical truss member of a bottom chassis of the backlight unit taken along the plane X-X indicated in FIG. 9 according to an embodiment of the present invention. FIG. 13 is a cross-sectional view illustrating a reinforcing truss member of a bottom chassis of the backlight unit taken along the plane XI-XI indicated in FIG. 9 according to an embodiment of the present invention. Referring to FIGS. 12 and 13, a thickness of at least one of the reinforcing truss members 12 and 14 may be larger than a thickness of at least one of the outer truss member 11, the outer truss member 13, and a vertical reinforcing member 16. Wherein a thickness of a vertical reinforcing member 16 may be equal to each of a thickness of the outer truss member 11 and a thickness of the outer truss member 13. In an embodiment, a width R2 of a cross-section of one of the reinforcing truss members 12 and 14 may be larger than a width R1 of a cross-section of one of the outer truss members 11 and 13 or a vertical reinforcing member 16. The truss structure may have sufficient strength, and displacement of the truss structure possibly caused an external force may be minimized.

As illustrated in FIGS. 12 and 13, each truss member may have a hollow structure, which includes a wall that surrounds a hollow. A thickness T2 of an outer wall of one of the reinforcing truss members 12 and 14 may be the equal to or unequal to a thickness T1 of an outer wall of one of the outer truss members 11 and 13 or a vertical reinforcing member 16.

In an embodiment, each truss member may have a substantially solid structure with substantially no intended hollow inside.

FIG. 14A, FIG. 14B, FIG. 14C, and FIG. 14D are diagrams illustrating cross-sectional structures of one or more truss members of the bottom chassis of the backlight light, e.g., one of more of the outer truss member 11, the outer truss member 13, a reinforcing truss member 12, a reinforcing truss member 14, a vertical reinforcing member 16, and a reinforcing bar 17 according to one or more embodiments of the present invention.

Figure 14A:
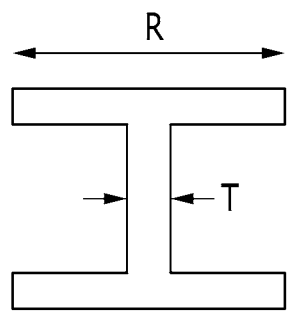
FIG. 14A, FIG. 14B, FIG. 14C, and FIG. 14D are diagrams illustrating cross-sectional structures of one or more truss members of the bottom chassis of the backlight light according to one or more embodiments of the present invention.
Figure 14B:
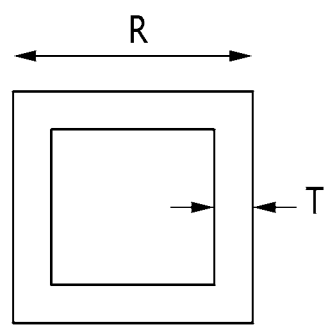
Figure 14C:
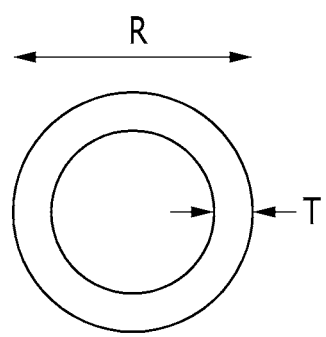
Figure 14D:
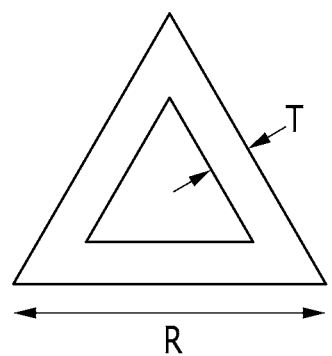

Referring to FIG. 14A, a cross-sectional structure of a truss member may have an 'H' shape. Referring to FIG. 14B, a cross-sectional structure of a truss member may have a quadrangle shape, for example, a rectangle shape. Referring to FIG. 14C, a cross-sectional structure of a truss member may have a circle or oval shape. Referring to FIG. 14D, a cross-sectional structure of a truss member may have a triangle shape. A cross-sectional structure of a reinforcing truss member may have one or more of various shapes.

A width or diameter R of a cross-section of a truss member may be in a range from approximately 1 mm to approximately 10 mm according to one or more embodiments. A wall thickness T of a cross-section of a truss member may be in a range from approximately 10% of a width or diameter R of the cross-section of a truss member to approximately 100% of the width or diameter R of the cross-section of a truss member according to one or more embodiments.

The reinforcing bar 17 of the bottom chassis 10 may also have the sectional structures in various forms illustrated in FIG. 14 or other sectional structure in various forms.

Figure 15:
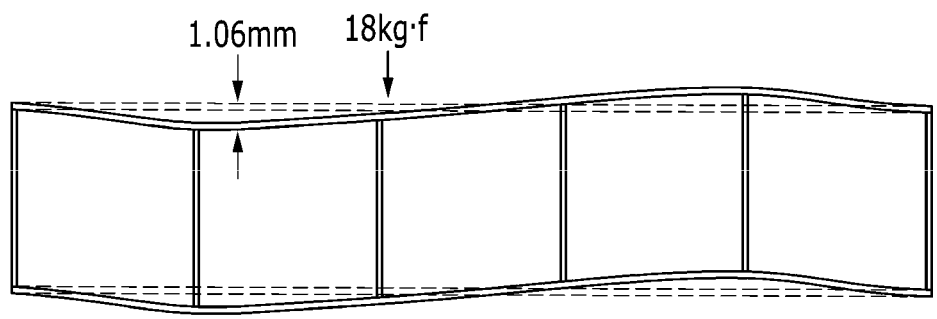
FIG. 15 is a diagram illustrating a simulation result showing deformation of a backlight unit due to an external force according to an embodiment of the present invention.
Figure 16:
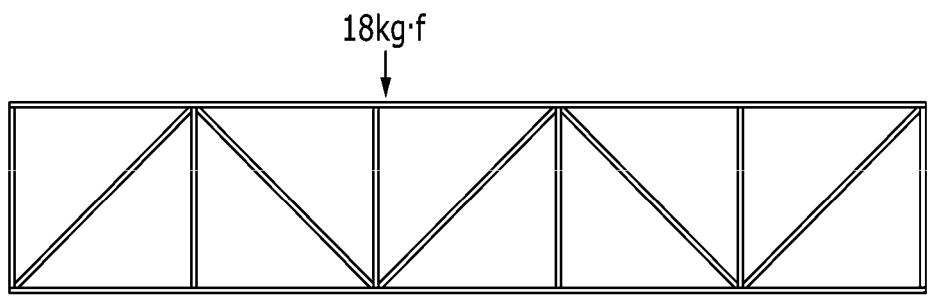
FIG. 16 is a diagram illustrating a simulation result showing a deformation of a backlight unit due to an external force according to an embodiment of the present invention.

FIG. 15 illustrates a simulation result showing deformation of a backlight unit caused by an external force according to an embodiment of the present invention, wherein the backlight unit includes linear reinforcing member without including a truss structure. FIG. 16 illustrates a simulation result showing deformation of backlight unit caused by an external force according to an embodiment of the present invention, wherein the backlight unit includes a truss structure.

Referring to FIG. 15, if the backlight unit 900 or 901 does not have a truss structure, the backlight unit 900 or 901 may substantially deform when being applied with an external force.

Referring to FIG. 16, if the backlight unit 900 or 901 has one or more of the truss structures discussed above, the backlight unit 900 or 901 may not substantially deform when being applied with the external force According to an embodiment of the present invention, the top chassis 30 may have one or more of the truss structures and/or one or more of the truss members described above.

In an embodiment, at least one of the front portion and a side portion of the top chassis 30 may have a truss structure and/or a truss member that is substantially identical to or analogous to a truss structure and/or a truss member of the mold frame 20 described with reference to one or more of FIGS. 1 to 6. In an embodiment, at least one of the front portion and a side portion of the top chassis 30 may have a truss structure and/or a truss member that is substantially identical to or analogous to a truss structure and/or a truss member of the bottom chassis 10 described with reference to one or more of FIGS. 7 to 14.

Figure 17:
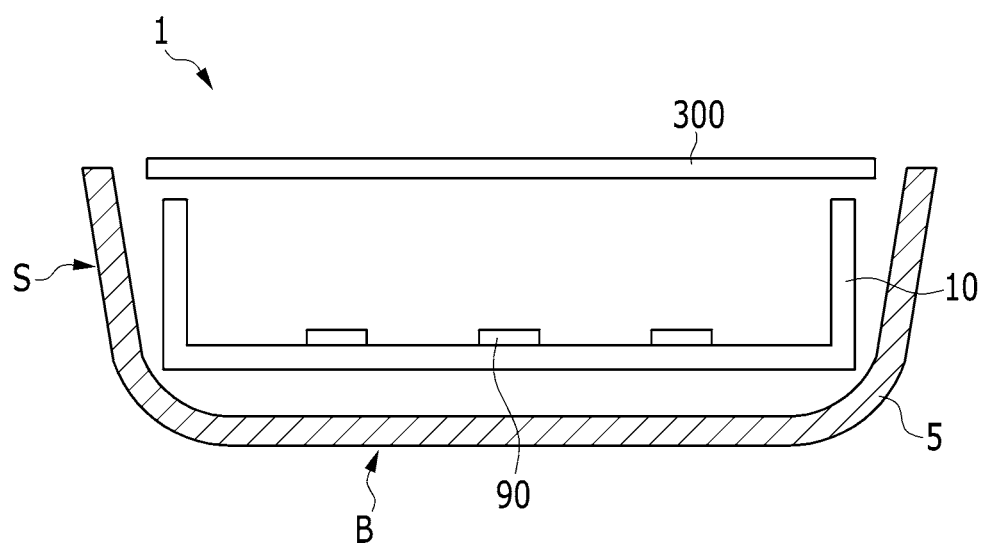
FIG. 17 is a cross-sectional view illustrating a display device that includes a backlight unit according to an embodiment of the present invention.

FIG. 17 is a cross-sectional view illustrating a display device that includes a backlight unit according to an embodiment of the present invention. Some elements and/or features of the display device illustrated in FIG. 17 may be substantially identical to or analogous to some elements and features of one or more display devices described with reference to one or more of FIGS. 1 to 16.

Referring to FIG. 17, the display device may include a display panel 300, a light source 90, a bottom chassis 10, and a rear cover 5.

The rear cover 5 may cover, enclose, secure, and/or protect the rear surface(s) of one or more of a backlight unit that includes the light source 90 and the bottom chassis 10, the display panel 300, a driving circuit, etc. The rear cover 5 may include a floor portion B and a side portion S. As illustrated in FIG. 17, the rear cover 5 may be separated from the bottom chassis 10. In an embodiment, the rear cover may be integrated with the bottom chassis 10. The rear cover 5 may include a non-conductive material (i.e., electrical insulating material), such as plastic.

At least one of the floor portion B and the side portion S of the rear cover 5 may have truss structure, for minimizing the weight of the display device and/or providing sufficient rigidity of the display device. For example, at least one of the side portion S and the floor portion B of the rear cover 5 may have a truss structure and/or a truss member that is substantially identical to or analogous to a truss structure and/or a truss member included in the mold frame 20 described with reference to one or more of FIGS. 1 to 6 and/or may have a truss structure and/or a truss member that is substantially identical to or analogous to a truss structure and/or a truss member included in the bottom chassis 10 described with reference to one or more of FIGS. 7 to 14.

Figure 18:
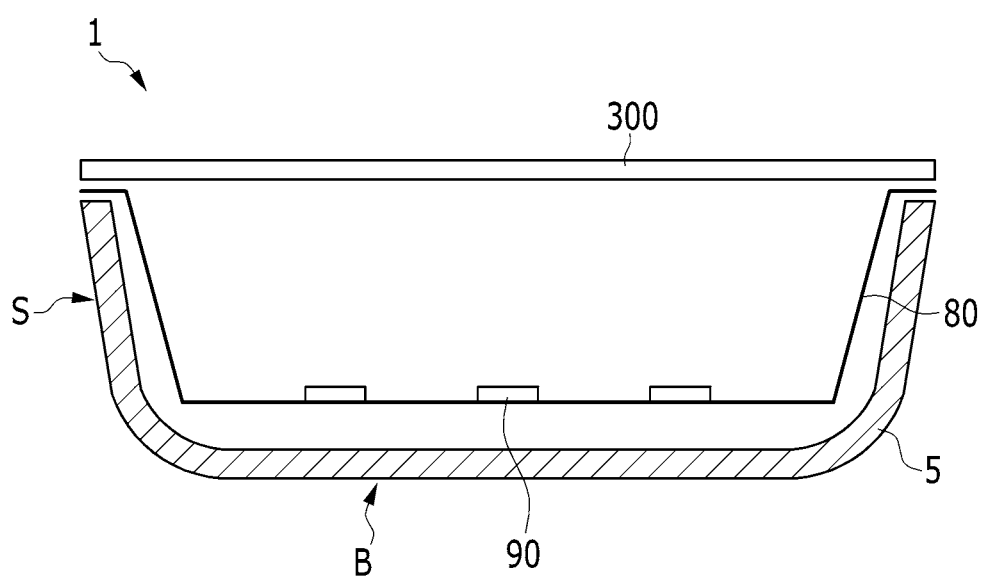
FIG. 18 is a cross-sectional view illustrating a display device that includes a backlight unit according to an embodiment of the present invention.

FIG. 18 is a cross-sectional view illustrating a display device that includes a backlight unit according to an embodiment of the present invention. Some elements and/or features of the display device illustrated in FIG. 18 may be substantially identical to or analogous to some elements and features of one or more display devices described with reference to one or more of FIGS. 1 to 17.

Referring to FIG. 18, a rear cover 5 may be integrated with a bottom chassis of a backlight unit and/or may function as a bottom chassis. A reflecting sheet 80 may be positioned between the rear cover 5 and a light source 90.

At least one of the floor portion B and the side portion S of the rear cover 5 may have truss structure, for minimizing the weight of the display device and/or providing sufficient rigidity of the display device. For example, at least one of the side portion S and the floor portion B of the rear cover 5 may have a truss structure and/or a truss member that is substantially identical to or analogous to a truss structure and/or a truss member included in the mold frame 20 described with reference to one or more of FIGS. 1 to 6 and/or may have a truss structure and/or a truss member that is substantially identical to or analogous to a truss structure and/or a truss member included in the bottom chassis 10 described with reference to one or more of FIGS. 7 to 14.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit for use in an image display device, the backlight unit comprising:
   a first structural unit including a first side portion and a second side portion, the first side portion having a first truss structure; and
   a light source disposed between the first side portion and the second side portion and configured to emit light,
   wherein the first truss structure includes a first outer member, a second outer member, a first reinforcing member, a second reinforcing member, and a third reinforcing member,
   wherein the first reinforcing member and the second reinforcing member are disposed between the first outer member and the second outer member,
   wherein a main surface of the first reinforcing member extends in a first direction,
   wherein a main surface of the second reinforcing member extends in a second direction that is different from the first direction,
   wherein each of the first reinforcing member and the second reinforcing member meets both the first outer member and the second outer member at an acute angle or an obtuse angle, and
   wherein the third reinforcing member is connected between the first outer member and the second outer member and is disposed perpendicular to both the first outer member and the second outer member.

2. The backlight unit of claim 1, further comprising: a diffusion plate disposed between the first truss structure and a top portion of the structural unit and configured to diffuse the light.

3. The backlight unit of claim 1, further comprising: a reflecting sheet disposed between the first truss structure and the light source and configured to reflect the light.

4. The backlight unit of claim 1, further comprising: a second structural unit enclosing the first structural unit and having a second truss structure, wherein the first truss structure is disposed between the second truss structure and the light source.

5. The backlight unit of claim 1, further comprising:
a diffusion plate configured to diffuse the light; and
a second structural unit having a second truss structure, wherein the first truss structure is disposed between the second truss structure and the diffusion plate.

6. The backlight unit of claim 1, wherein the first structural unit comprises a support member supporting the light source, and
wherein at least one selected from the group consisting of the first outer member, the second outer member, the first reinforcing member, and the second reinforcing member is bar shaped.

7. The backlight unit of claim 6, wherein the first reinforcing member, the second reinforcing member, and at least one of the first outer member and the second outer member form a structural element that has a triangular inner surface.

8. The display device of claim 6,
wherein the third reinforcing member, the first reinforcing member and the second reinforcing member form a structural element that has a triangular inner surface.

9. The display device of claim 6, wherein at least one selected from the group consisting of the first outer member, the second outer member, the first reinforcing member, and the second reinforcing member has a hollow structure.

10. The backlight unit of claim 1,
wherein each of the first outer member and the second outer member is plate shaped.

11. The backlight unit of claim 10, wherein the first reinforcing member, the second reinforcing member, and at least one of the first outer member and the second outer member form a structural element that has a triangular inner surface.

12. The backlight unit of claim 10, wherein the second outer member is disposed between the first outer member and at least one of the light source and a reflecting sheet that is configured to reflect the light.

13. The backlight unit of claim 10, wherein the second outer member is directly connected to the first outer member and is disposed at a first acute angle with respect to the first outer member.

14. The backlight unit of claim 13, further comprising: a diffusion plate disposed at a second acute angle with respect to the second outer member and configured to diffuse the light.

15. A display device comprising:
a display panel configured to display an image;
a light source configured to provide light for the display panel to display the image; and
a first structural unit having a first truss structure,
wherein the first truss structure includes a first outer member, a second outer member, a first reinforcing member, a second reinforcing member, and a third reinforcing member,
wherein the first reinforcing member and the second reinforcing member are disposed between the first outer member and the second outer member,
wherein a main surface of the first reinforcing member extends in a first direction, wherein a main surface of the second reinforcing member extends in a second direction that is different from the first direction,
wherein each of the first reinforcing member and the second reinforcing member meets both the first outer member and the second outer member at an acute angle or an obtuse angle, and
wherein the third reinforcing member is connected between the first outer member and the second outer member and is disposed perpendicular to both the first outer member and the second first outer member.

16. The display device of clam 15, wherein the light source is disposed between the first truss structure and the display panel.

17. The display device of claim 15, further comprising: a diffusion plate disposed between the first truss structure and the display panel and configured to diffuse the light.

18. The display device of clam 15, further comprising:
a second structural unit including a first side portion and a second side portion, the first side portion having a second truss structure,
wherein the light source is disposed between the first side portion and the second side portion, and
wherein the second structural unit is disposed inside the first structural unit.

19. A backlight unit for use in an image display device, the backlight unit comprising:
a first structural unit including a first side portion and a second side portion, the first side portion having a first truss structure, the second side portion having a second truss structure;
a light source disposed between the first side portion and the second side portion and configured to emit light; and
a first support member and a second support member spaced from each other, each of the first support member and the second support member being disposed between the first side portion and the second side portion and being directly connected to each of a bar member of the first truss structure and a bar member of the second truss structure, the first support member overlapping at least one of the light source and a first printed circuit board that is electrically connected to the light source.

20. The backlight unit of claim 19, further comprising: a reflecting sheet disposed between the first support member and the second support member, disposed between the bar member of the first truss structure and the bar member of the second truss structure, and configured to reflect the light.

21. The backlight unit of claim 19, further comprising:
the first printed circuit board, wherein the first printed circuit board overlaps the first support member; and
a second printed circuit board spaced from the first printed circuit board, overlapping the first support member, and electrically connected to a second light source.

22. The backlight unit of claim 21, wherein the second support member overlap both the first printed circuit board and the second printed circuit board.

* * * * *